United States Patent Office 3,502,421
Patented Mar. 24, 1970

3,502,421
DYEING OR PRINTING SYNTHETIC POLYAMIDE MATERIALS AND THE MATERIALS DYED OR PRINTED BY THIS PROCESS
Donald Keighley Clough, Bolton, Bradford, England, assignor to Sandoz Ltd. (also known as Sandoz A.G.), Basel, Switzerland
No Drawing. Filed Nov. 4, 1966, Ser. No. 591,960
Claims priority, application Great Britain, Nov. 8, 1965, 47,192/65
Int. Cl. D06p 5/02
U.S. Cl. 8—4
8 Claims

ABSTRACT OF THE DISCLOSURE

Wet fastness properties of dyeings with water-soluble dyestuffs containing at least one primary or secondary amino group are improved by after-treating the dyeings with a polyhalogenoquinone.

---

In the British patent specification No. 926,975 it has been proposed to dye or pad hydrophobic materials by treating them consecutively and in either sequence with aromatic compounds containing primary and/or secondary amine groups or their salts and with (a) quinones or (b) N-haloquinones-imines or N,N'-dihaloquinone di-imines of optionally substituted quinones or (c) the compounds containing the grouping

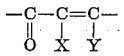

in a non-aromatic carbocyclic ring, whereby X and Y denote carbon-carbon bonds or hydrogen or halogen atoms. The dyeing assistants of the groups (a), (b) and (c) are oxidizing agents.

The present invention is concerned particularly with dyeing, padding and printing synthetic polyamide materials and particularly relates to the improvement of the wet-fastness properties of the dyed material.

According to the present invention a process for dyeing, padding and printing synthetic polyamide materials comprises treating said materials with at least one water-soluble dyestuff capable of dyeing such materials, which dyestuff contains at least one primary or secondary amino group, and thereafter with a polyhalogenoquinone. The dyestuff contains at least one water-solubilizing group such as the carboxylic acid or sulphonic acid group or the sulphonic acid amide group; it may also be metallized.

It is important that at least one amino group in the dyestuff be reactive and therefore free from steric hindrance, and from participation intra-molecular hydrogen-bonding. Particularly, in all classes of dyes, where a single amino group is present, this should not be in the same benzenoid ring as a sulphonic acid group; and in the case of azo dyes, where only one amino group is present, it is important that this should not be in ortho-position to an azo group. In the case of a water-soluble polyazo dyestuff of the formula $$A-N=N-(X-N=N-)_n-Z \qquad (I)$$

where $n \geqslant 1$ it is preferable that at least one such amino group should be attached to an end grouping A or Z.

In Formula I the symbols A, X and Z represent preferably phenyl or naphthyl radicals, which in addition to amino, carboxylic acid, sulphonic acid or sulphonic acid amide groups may contain other substituents commonly used in colour chemistry, for example alkyl, alkoxy or acyl groups, halogen atoms, nitro or cyano groups. Thus the dyestuffs may be, for example, diazo dyestuffs of the benzeneazobenzene-azonaphthalene series bearing one or two amino groups and one or two water-solubilising groups, benzene-azo-diphenylazobenzene dyestuffs having up to four amino groups and two water-solubilizing groups, benzene-azo-dinaphthylamino-azobenzene dyestuffs with two amino groups and two water-solubilizing groups, benzene-azonaphthalene-azobenzene dyestuffs with two amino groups and two water-solubilizing groups, trisazo dyes of the naphthalene-azobenzene-azonaphthalene-azobenzene series having up to three amino groups and two water-solubilizing groups, naphthalene-azobenzene-azonaphthalene-azonaphthalene dyestuffs having two amino groups and three water-solubilizing groups, or metal complex dyestuffs of the benzene-azonaphthalene or naphthalene-azonaphthalene series having one to three amino groups and one water-solubilizing substituent.

The range of further water-soluble dyestuffs capable of dyeing synthetic polyamide materials is, in general, well known.

Suitable synthetic polyamide materials are, for example, those made from hexamethylene diamine and adipic acid (nylon 66), from hexamethylene diamines and sebacic acid (nylon 610), from ε-caprolactam (nylon 6), from ω-aminoundecanoic acid (nylon 11) or from ε-caprolactam, hexamethylene diamine and adipic acid (nylon 6/66). Such materials may be shaped in the form of filaments, fibres, fibre fabrics, films or foils. In the present specification the term polyamide is intended to include polyurethanes.

Although good results can be obtained according to the process of the present invention by using water-soluble dyestuffs containing only one primary or secondary amino group, particularly advantageous results are obtained when the dyestuff or dyestuffs have two or more primary or secondary amino groups, provided that in all cases at least one of the amino groups is not in the same benzenoid ring as a sulphonic acid group, where one is present, and is not, in the case of a water-soluble azo dyestuff, in ortho-position to an azo group.

Polyhalogenquinones with two or more reactive halogen atoms are suitable for the present invention but examples which are especially suitable are 2,3,5,6-tetrachloro-1,4-benzoquinone and 2,3,5,6-tetrabromo-1,4-benzoquinone.

The treatment of the synthetic polyamide materials with the water-soluble dyestuffs and with the polyhalogenoquinones may take different forms. The dyeing or print obtained with the water-soluble dyestuff can be after-treated in the exhausted dyebath or in a fresh bath with a polyhalogenoquinone, for example in an amount ranging from 0.1 to 20% of the weight of the dyed or printed material at 20° C. to 100° C., optionally in the presence of an acid acceptor. It is also possible to dry the dyeing or print obtained with the water-soluble dyestuff, to impregnate it with a solution of a polyhalogenoquinone, for example of 1 to 10 parts in 100 parts of an organic solvent, to dry it again and then to subject it to a steam or hot air treatment at 100° to 220° C., for example at 100° to 150° C. for the steam treatment, or respectively with dry air heated at 110° to 220° C. for 1 to 30 minutes; the higher the temperature, the shorter the treatment time required.

It is often advantageous to add an acid acceptor. Suitable acid acceptors are, for example, the acetates, bicarbonates, carbonates and hydroxides of sodium or potassium, trisodium phosphate, sodium metalsilicate, borax and the like. The acid acceptor is advantageously used in an amount of 2 to 10% referred to the weight of the material to be treated. In general, the proportion of acid acceptor should be sufficient to ensure that the whole of the hydrohalic acid eliminated during fixing is neutralised.

It is advantageous to add further an emulsifier or dispersant, preferably a non-ionic or an anionic one.

The present process affords fast dyeings and prints in a short time and in an uncomplicated manner. They are very fast to wet treatments, especially to washing, water, sea water and perspiration.

Parts and percentages in the following examples are by weight and temperatures are shown in degrees centigrade, references are to the Second Edition of the Colour Index.

EXAMPLE 1

A mixture of 20 parts of 2,3,5,6-tetrachloro-1,4-benzoquinone, 10 parts of sodium dinaphthylmethane disulphonate, 1 part of polyvinyl alcohol and 69 parts of water is ground in a ball mill until it forms a fine dispersion.

4 parts of Diazol Black SD (C.I. Direct Black 17; 27700) and 2 parts of acetic acid are dissolved in 4000 parts of water and 100 parts of nylon 66 are entered into this dyebath. The dyebath is raised to the boil with 30 minutes and is maintained for one hour at 98–100°. The nylon 66 is then treated in a second liquor containing 12 parts of the dispersion of 2,3,5,6-tetrachloro-1,4-benzoquinone described above in 4000 parts of water. This liquor is raised to the boil within 30 minutes and is maintained for 30 minutes at 98–100°, whereupon 8 parts of anhydrous sodium carbonate are added. The nylon 66 is treated for a further 10 minutes at 98–100° and is then rinsed, removed from the bath and dried. The after-treatment causes a very significant increase in the wet fastness of the original dyeing and a deepening of the black shade.

If the 100 parts of nylon 66 in this example are replaced by 100 parts of nylon 6, a similar improvement in wet fastness properties and a similar change of shade are observed.

When 4 parts of Diazol Black V (C.I. Direct Black 78; 30015) or 4 parts of Passive Black B (C.I. Direct Black 80; 31600) are used in place of the 4 parts of Diazol Black SD, the dyeings also show improved wet fastness and a deepening of the shade over the original dyeing before the after-treatment.

EXAMPLE 2

100 parts of nylon 66 are dyed with Diazol Black SD in the same way as in Example 1 except that 12 parts of the dispersion of 2,3,5,6-tetrachloro-1,4-benzoquinone are added to the exhausted dyebath without further dilution at 98–100°. The bath is then held for 30 minutes at 98–100°, after which the after-treatment is continued as before. The wet fastness properties of the dyeing are enhanced as in Example 1.

In the following examples the procedure is as in Example 1 except that the 4 parts of Diazol Black SD are replaced by 4 parts of the dyes shown. The change in shade on nylon 6 or nylon 66 on after-treatment is shown in the following table:

| Example | Dye | Colour Change |
| --- | --- | --- |
| 3 | Toluylene Orange R (C.I. Direct Orange 10; 23370). | Orange→dark brown |
| 4 | Chloramine Brown 2 ME (C.I. Direct Brown 2; 22311. | Brown→violet-brown |
| 5 | C.I. Direct Red 149; 29110 | Red→bordeaux. |
| 6 | Diazamine Orange R (C.I. Direct Orange 73; 25200). | Yellow→mustard-yellow. |
| 7 | Azo Dark Green A (C.I. Acid Green 20; 20495). | Dark green→very dark green. |

The wet fastness of these dyeings following the after-treatment is distinctly improved.

EXAMPLE 8

In this example 100 parts of nylon 6 are dyed and aftertreated by the method of Example 1 except that in place of the 4 parts of Diazol Black SD there are used 2 parts of the dyestuff obtained by reduction of the nitro groups of C.I. Acid Black 52 (C.I. No. 15711) with sodium sulphide. The originally black shade is deepened by the after-treatment and the wet fastness is improved. If the 100 parts of nylon 6 are replaced by 100 parts of nylon 66 the dark grey shade obtained is deeper and faster to washing than the dyeing obtained without after-treatment.

EXAMPLE 9

The procedure of Example 1 is followed replacing the 4 parts of Diazol Black SD with 4 parts of the dye obtained by sodium sulphide reduction of C.I. Acid Green 35 (C.I. No. 13361). On nylon 6 the shade of the green dyeing becomes deeper and yellower upon after-treatment; on nylon 66 similar effects are observed, but the original dyeing is somewhat lighter in depth. The wet fastness properties are improved as before.

EXAMPLE 10

If the 4 parts of Diazol Black SD of Example 1 are replaced by 4 parts of the grey dyestuff obtained by sodium sulphide reduction of C.I. Acid Brown 28, the originally grey dyeing on nylon 6 becomes violet upon after-treatment (whereby the wet fastness properties are improved).

EXAMPLE 11

If a mixture of 3 parts of Diazol Black SD (C.I. Direct Black 17; 27700), 0.4 parts of Toluylene Orange R (C.I. Direct Orange 10; 23370) and 0.4 parts of Azo Dark Green A (C.I. Acid Green 20; 20495) is substituted for the 4 parts of Diazol Black SD of Example 1, the dyeing becomes faster to wet treatment upon after-treatment with the tetrachlorobenzoquinone dispersion and the depth of the black shade obtained is thereby increased.

EXAMPLE 12

100 parts of a fabric of nylon 66 are padded with a padding liquor of the following composition:

| | Parts |
| --- | --- |
| Diazol Black SD | 40 |
| Sandozol KB (a solution of 30% highly sulfonated castor oil) | 2 |
| Solidokoll K (a soluble acryl-resin of "Farbwerke Cassella") | 20 |
| Water | 938 |
| Total | 1000 |

The fabric is expressed between two pad rollers to an increase of 100% over the dry weight. It is then dried on a stenter and the dyeing fixed in dry heat for 1 minute at 200°. The fabric is aftertreated with 2,3,5,6 - tetrabromo-1,4-benzoquinone in a fresh bath as described in Example 1 and then finished. The aftertreatment leads to a considerable improvement in the wet fastness as compared with the initial dyeing and it deepens the black shade.

EXAMPLE 13

40 parts of Diazol Black SD and 50 parts of thiodiethylene glycol are dissolved in 200 parts of water. The solution is stirred into 500 parts of a thickening agent of the crystal gum or carob gum derivative type, in which 60 parts of thiourea have been previously dissolved by heating. When the mixture has cooled, 60 parts of ammonium sulphate, dissolved 1:2 in water, are added, and the whole is made up to 1000 parts with water or thickening agent. This printing paste is applied to nylon 66 or nylon 6 in the form of woven or knitted fabric or yarn. The print is dried and the dyestuff fixed by steaming for 20 minutes under saturated steam conditions and at atmospheric pressure. Subsequently the print is rinsed with cold water and aftertreated with 2,3,5,6-tetrachloro-1,4-benzoquinone as in Example 1 to improve the wet fastness properties.

Having thus disclosed the invention what I claim is:
1. A process for dyeing, padding or printing shaped synthetic polyamide which comprises treating said polyamide with at least one water-soluble dyestuff containing (a) at least one carboxylic acid, sulphonic acid or sulphonic acid amide group and (b) at least one primary or secondary amino group and after-treating the resultant with a polyhalogenobenzoquinone.

2. A process according to claim 1 wherein the polyhalogenobenzoquinone is 2,3,5,6-tetrachloro-1,4 - benzoquinone or 2,3,5,6-tetrabromo-1,4-benzoquinone.

3. A process according to claim 1 wherein the shaped polyamide is in the form of filament, fibre, fibre fabric, film or foil.

4. A process according to claim 3 wherein the polyhalogenobenzoquinone is 2,3,5,6-tetrachloro - 1,4-benzoquinone.

5. A process according to claim 3 wherein the polyhalogenobenzoquinone is 2,3,5,6-tetrabromo - 1,4-benzoquinone.

6. A process according to claim 1 wherein the dyestuff is an azo dyestuff.

7. Synthetic polyamide dyed, padded or printed according to the process of claim 1.

8. A process for improving the wetfastness of synthetic shaped polyamide dyed with water-soluble dyestuff containing (a) at least one member selected from the group consisting of a carboxylic acid, a sulphonic acid and a sulphonic acid amide group and (b) at least one member selected from the group consisting of a primary amino and a secondary amino group, which process comprises aftertreating the resulting dyed synthetic polyamide with a polyhalogenobenzoquinone.

References Cited

UNITED STATES PATENTS

| 3,253,878 | 5/1966 | Kruckenberg et al. | 8—55 |
| 3,254,934 | 6/1966 | Schwarz et al. | 8—32 X |
| 3,254,936 | 6/1966 | Schwarz et al. | 8—55 |

GEORGE F. LESMES, Primary Examiner

T. J. HERBERT, Jr., Assistant Examiner

U.S. Cl. X.R.

8—62, 165, 178